(12) United States Patent
Zieger

(10) Patent No.: US 6,691,338 B2
(45) Date of Patent: Feb. 17, 2004

(54) SPA SHOWER AND CONTROLLER

(75) Inventor: Claus D. Zieger, City of Industry, CA (US)

(73) Assignee: Interbath, Inc., City of Industry, CA (US)

( * ) Notice: Subject to any disclaimer, the term of this patent is extended or adjusted under 35 U.S.C. 154(b) by 0 days.

(21) Appl. No.: 09/827,484

(22) Filed: Apr. 6, 2001

(65) Prior Publication Data

US 2002/0144341 A1 Oct. 10, 2002

(51) Int. Cl.[7] .................................................. A47K 3/22
(52) U.S. Cl. ........................ 4/605; 4/696; 4/695; 4/661
(58) Field of Search ........................... 4/605, 601, 696, 4/596, 597, 541.1, 695, 661; 137/883, 625.4, 360, 377; 236/93 B, 93 A

(56) References Cited

U.S. PATENT DOCUMENTS

| | | | | |
|---|---|---|---|---|
| 432,712 A | * | 7/1890 | Taylor | 4/601 |
| 1,946,207 A | * | 2/1934 | Haire | 4/418 |
| 2,930,505 A | * | 3/1960 | Meyer | 4/661 |
| 2,957,587 A | * | 10/1960 | Tobin | 108/27 |
| 2,992,437 A | * | 7/1961 | Nelson et al. | 4/695 |
| 3,236,545 A | * | 2/1966 | Parkes et al. | 285/215 |
| 3,566,917 A | * | 3/1971 | White | 137/883 |
| 4,042,984 A | * | 8/1977 | Butler | |
| 4,135,549 A | * | 1/1979 | Baker | 137/883 |
| 4,167,196 A | * | 9/1979 | Morris | 137/360 |
| 4,432,392 A | * | 2/1984 | Paley | 137/883 |
| 4,572,232 A | * | 2/1986 | Gruber | 4/695 |
| 4,654,900 A | * | 4/1987 | McGhee | 4/670 |
| 4,854,499 A | * | 8/1989 | Neuman | 4/605 |
| 4,896,658 A | | 1/1990 | Yonekubo et al. | |
| 4,909,435 A | | 3/1990 | Kidouchi et al. | |
| 4,976,460 A | * | 12/1990 | Newcombe et al. | |
| 5,020,570 A | * | 6/1991 | Cotter | |
| 5,058,804 A | | 10/1991 | Yonekubo et al. | |
| 5,121,511 A | * | 6/1992 | Sakamoto et al. | 4/601 |
| 5,206,963 A | * | 5/1993 | Wiens | 4/597 |
| 5,253,670 A | * | 10/1993 | Perrott | 137/360 |
| 5,329,650 A | * | 7/1994 | Zaccai et al. | 4/596 |
| 5,414,879 A | * | 5/1995 | Hiraishi et al. | 4/601 |
| 5,605,173 A | * | 2/1997 | Arnaud | 137/597 |
| 5,979,776 A | | 11/1999 | Williams | |
| 6,003,165 A | * | 12/1999 | Loyd | 4/541.1 |
| 6,085,780 A | * | 7/2000 | Morris | 137/377 |
| 6,199,580 B1 | * | 3/2001 | Morris | |
| 6,202,679 B1 | * | 3/2001 | Titus | |
| 6,286,764 B1 | * | 9/2001 | Garvey et al. | |
| 6,349,735 B2 | * | 2/2002 | Gul | 137/360 |

FOREIGN PATENT DOCUMENTS

| | | | |
|---|---|---|---|
| GB | 2155984 A | * | 10/1985 |
| JP | 4-62238 | * | 2/1992 |
| JP | 4-146708 | * | 5/1992 |

OTHER PUBLICATIONS

Stephen S. Macey; "Spa Audio system operable with a remote control"; US Publication No. 2002/0025050 A1; Publication Date: Feb. 28, 2002.*

* cited by examiner

Primary Examiner—Gregory Huson
Assistant Examiner—Khao D. Huynh
(74) Attorney, Agent, or Firm—Foley & Lardner

(57) ABSTRACT

Systems and method for providing automated control over both water and temperature and pressure for a plurality of shower heads or other sources of water. The automated systems and methods for providing automated control over both water pressure and temperature make use of three distinct modules which comprise an input and display unit, and electronic processing unit, and the mechanical plumbing control unit. The electronic processing unit receives signals from the input and display unit and translates the received signals into the appropriate control signals for the mechanical plumbing control unit. A user is able to control the output water temperature from each of the shower heads or water sources as well as the individual water pressure from each of the shower heads or water sources. In the preferred exemplary embodiment, the housing of containing the electrical mechanical elements of the system is dimensioned such that the housing will advantageously fit within the cavity of the typical wall.

17 Claims, 4 Drawing Sheets

SPA SHOWER AND CONTROLLER

BACKGROUND OF THE INVENTION

1. Field of the Invention

The present invention relates generally to the field of shower facilities having a plurality of shower heads. More specifically, the present invention is directed to an automated water pressure and/or temperature control system for shower facilities having multiple shower heads and systems and methods for remotely controlling the water temperature and/or pressure of a plurality of shower heads. Another aspect of the systems and methods of the present invention is an innovative and novel housing for the system electromechanical controller which is dimensioned to advantageously allow placement of this portion of the system within the confines of a wall.

2. Description of the Related Art

In high-end shower facilities there are a variety of showers which are currently available that provide multiple shower heads or other sources of water that may be manually adjusted and controlled for temperature and water pressure by an individual. In these conventional systems, as many as five or more different shower heads or water sources are provided. Typically the shower heads or water sources are located in various locations throughout the single facility. These known systems typically provide a single manual control for operation of a plurality of shower heads.

In these existing showers, an individual is able to adjust a shower temperature and/or pressure for the various shower heads by manually controlling one or more valves for hot and cold water which feed a common pipe that in turn feeds each of a plurality of shower heads in the common facility. In most of the systems, a single manual control valve is provided for controlling both the blend of hot and cold water as well as the pressure of the water output from each of the showerheads. Individual control of each of the shower heads or water sources for the temperature and pressure of the water transmitted by these sources is only possible by installing a pressure control valve for each individual water outlet.

One of the shortcomings of the conventional systems is that a single control point for multiple shower heads or water sources typically does not provide the user with the flexibility for controlling each of the showers or sources to a desired flow or pressure and temperature. Furthermore, other conventional designs do not allow the user to have sufficient flexibility and ease-of-use in manipulating the controls of the various showerheads. Furthermore, the control systems for these devices are often cumbersome and difficult to install. The users of these types of shower systems usually want to have greater flexibility in controlling each of the various shower heads as to both temperature and pressure. They will also find it convenient to program water spray type, pulse rate, or time etc.

Another significant problem with the existing conventional systems is that any temperature adjustment must be made manually by altering a single temperature adjustment control. This is typically accomplished by manually adjusting a valve which alters the amounts of hot and cold water flowing through the entire system. While this can provide satisfactory results, most existing shower systems are susceptible to temperature fluctuations due to variations in output from water heaters and system pressure variations.

SUMMARY OF THE INVENTION

The present invention is directed to various systems and methods for providing automated control over both water temperature and pressure for a plurality of shower heads or other sources of water at a single location. In the preferred exemplary embodiment, the automated systems and methods for providing automated control over both water pressure and temperature of the present invention make use of three distinct modules or systems which comprise an input and display unit, an electronic signal processing unit, and the electromechanical plumbing control unit.

The electronic processing unit is preferably connected to the input and display unit via a cable which in the preferred exemplary embodiment is preferably an RS 485 cable. In an alternate exemplary embodiment, control signals are transmitted from a remote control unit to the electronic processing unit via either radio waves or infrared transmission. The electronic processing unit receives signals from the input and display unit and translates the received signals into the appropriate control signals for the mechanical plumbing control unit. Additionally, feedback signals are utilized to provide any necessary information for making the appropriate adjustments by the system. A user is able to control the output water temperature from each of the shower heads or water sources as well as the individual water pressure for each of the shower heads or water sources.

The electronic processing unit is preferably located within approximately 65 feet from the input and display unit. This is preferred in order to ensure that the appropriate signals are received and decoded based on the originally transmitted signals. The input and display unit is also capable of transmitting control signals for another unit such as, for example, a light, a CD player or radio in order to add even greater flexibility to the overall system. These signals are also processed by the electronic processing unit.

The mechanical plumbing control unit of the preferred exemplary embodiment is comprised of a thermostatic valve which receives water input from hot and cold supply lines. The output of the thermostatic valve in turn feeds an assembly comprised of a manifold. The manifold provides outputs to each of the shower heads or other sources of water. The manifold assembly includes a plurality of solenoid valves which respectively selectively control the flow of water from the manifold leading to the individual showerhead installations.

The setting of the thermostatic control valve which operates under the control of the electronic processing unit determines the temperature of the water output to each of the shower heads or other sources of water. A temperature sensing member is inserted in line from the output of the thermostatic control valve which provides the current blend of hot and cold water. The electronic processing unit receives a single representative of the actual water temperature at the output of the thermostatic valve. This signal is used in order to provide feedback to the electronic processing unit which is able to determine the appropriate adjustment for hot and cold water inlet valves of the thermostatic valve based on a user selected or desired temperature.

If the actual water temperature is too great, the thermostatic control valve may either increase the flow of cold water or decrease the flow of hot water or both. The converse is also true for situations where the actual water temperature is too low.

The blended water output from the thermostatic valve passes by the temperature sensing element and into a manifold which in the preferred exemplary embodiment includes five outputs for transmitting the blended water to a corresponding showerhead or other water source. Each of the five outputs from the manifold has a corresponding solenoid valve control which is used to turn on and off water flowing from the corresponding showerhead or other water source. Each of the solenoid valve controls of the manifold is in electrical communication with the electronic control unit. The user is able to select the desired water output from each of the respective shower heads or water sources based on user selection input to the input and display unit. The user may selectively turn on and off the flow of water from at any of the shower heads or sources of water via automatic control of the solenoid valves. In an alternate exemplary embodiment, where the solenoid valves are replaced with more capable electromechanical control valves, the user is able to actually individually adjust the water pressure at each of the individual showerheads. The solenoid valves have been selected in the preferred exemplary embodiment in order to reduce the cost of the overall system.

In accordance with the systems and methods of the present invention, a user is able to selectively modify both temperature and pressure on a plurality of shower heads or other water sources. The system provides the user with tremendous flexibility and is both safe and simple to operate. Those skilled in the art will appreciate that various modifications and changes in a specific design are possible which nevertheless will utilize the concepts disclose herein with reference to the present invention.

DETAILED DESCRIPTION OF THE PREFERRED EMBODIMENTS

Figure 1:
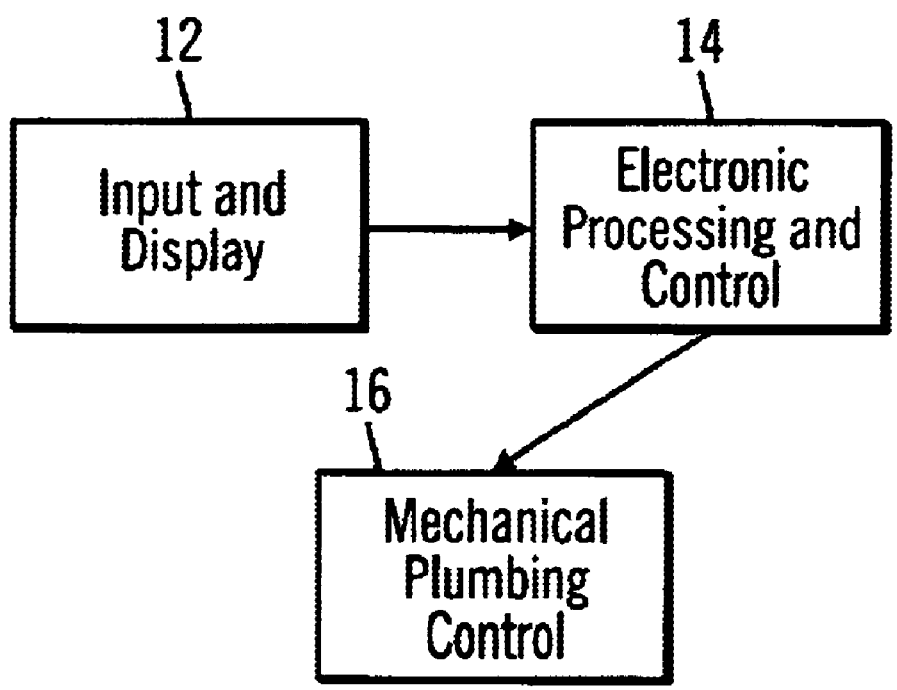
FIG. 1 is a block diagram illustration of an exemplary embodiment of the present invention.

A first exemplary embodiment of the systems and methods for providing automated control over both water temperature and pressure for a plurality of shower heads or other sources of water is shown generally at 10 FIG. 1. In the preferred exemplary embodiment illustrated in FIG. 1, the automated systems and methods for providing automated control over both water pressure and temperature make use of three distinct modules or systems which comprise an input and display unit 12, an electronic processing unit 14, and a mechanical plumbing control unit 16.

Figure 3:
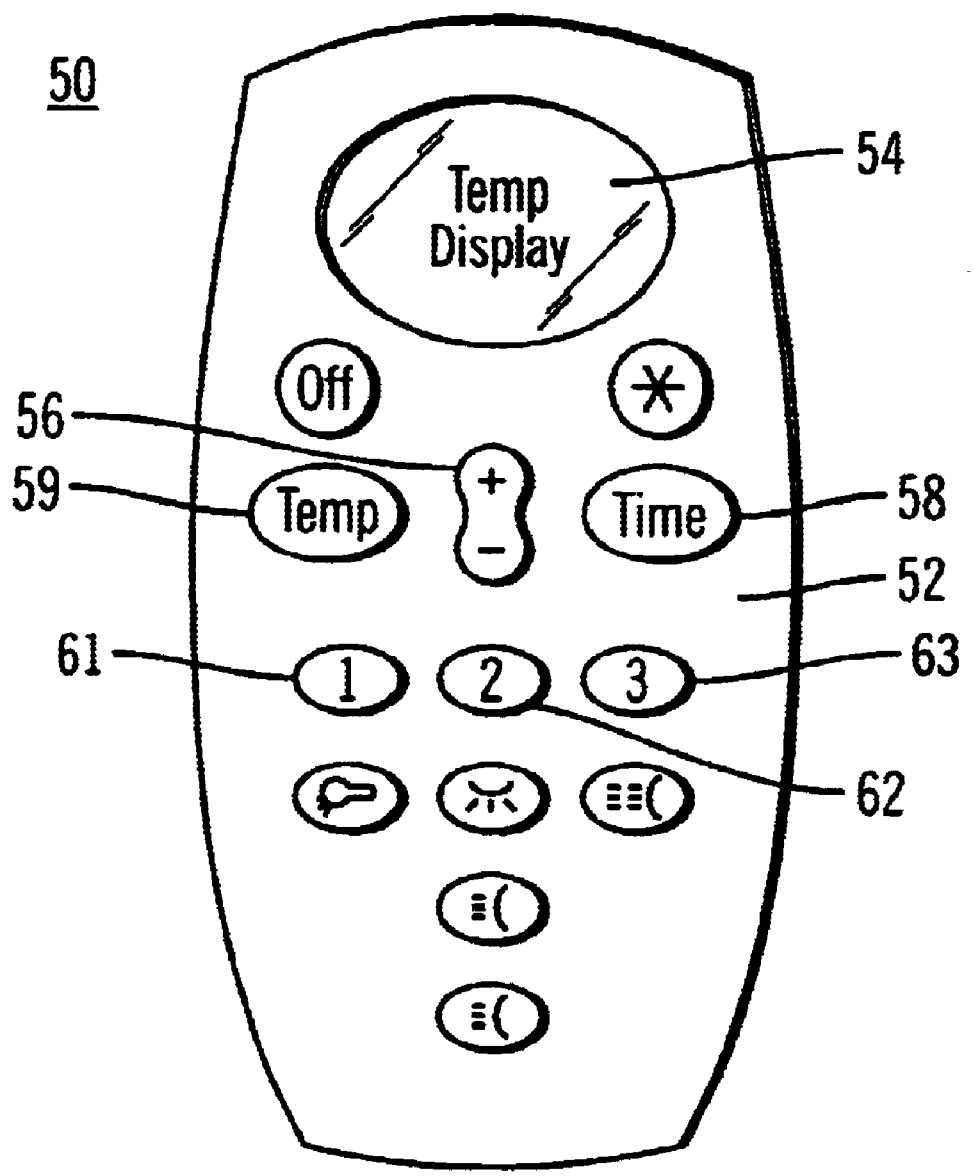
FIG. 3 is a diagram illustrating the electronic remote control unit of the present invention.

The electronic processing unit 14 is preferably connected to the input and display unit via a cable which, as noted above, is preferably an RS 485 cable. In an alternate exemplary embodiment, control signals are transmitted from a remote control input and display unit to the electronic processing unit via either radio waves or infrared transmission. The remote control unit is illustrated in FIG. 3 as described below. Those skilled in the art will recognize that both a fixed and mobile input and display unit may be utilized simultaneously in accordance with the systems and methods of present invention.

The electronic processing unit 14 receives signals from the input and display unit 12 and translates the received signals into the appropriate control signals for the mechanical plumbing control unit 16. A user is able to control the output water temperature from each of the shower heads or water sources as well as selectively turn on and off the water flow from each of the shower heads or water sources. The individual shower heads or sources of water are not shown in this figure for the sake of convenience. They are illustrated in more detail below.

The electronic processing unit 14 is preferably located within approximately 65 feet from the input and display unit in order to assure proper signal transmission. The input and display unit 12, in an alternate exemplary embodiment, is also capable of transmitting control signals for another unit such as, for example, a light, a CD player or radio. The signals for the additional systems are also processed by the electronic processing unit 14.

Figure 2:
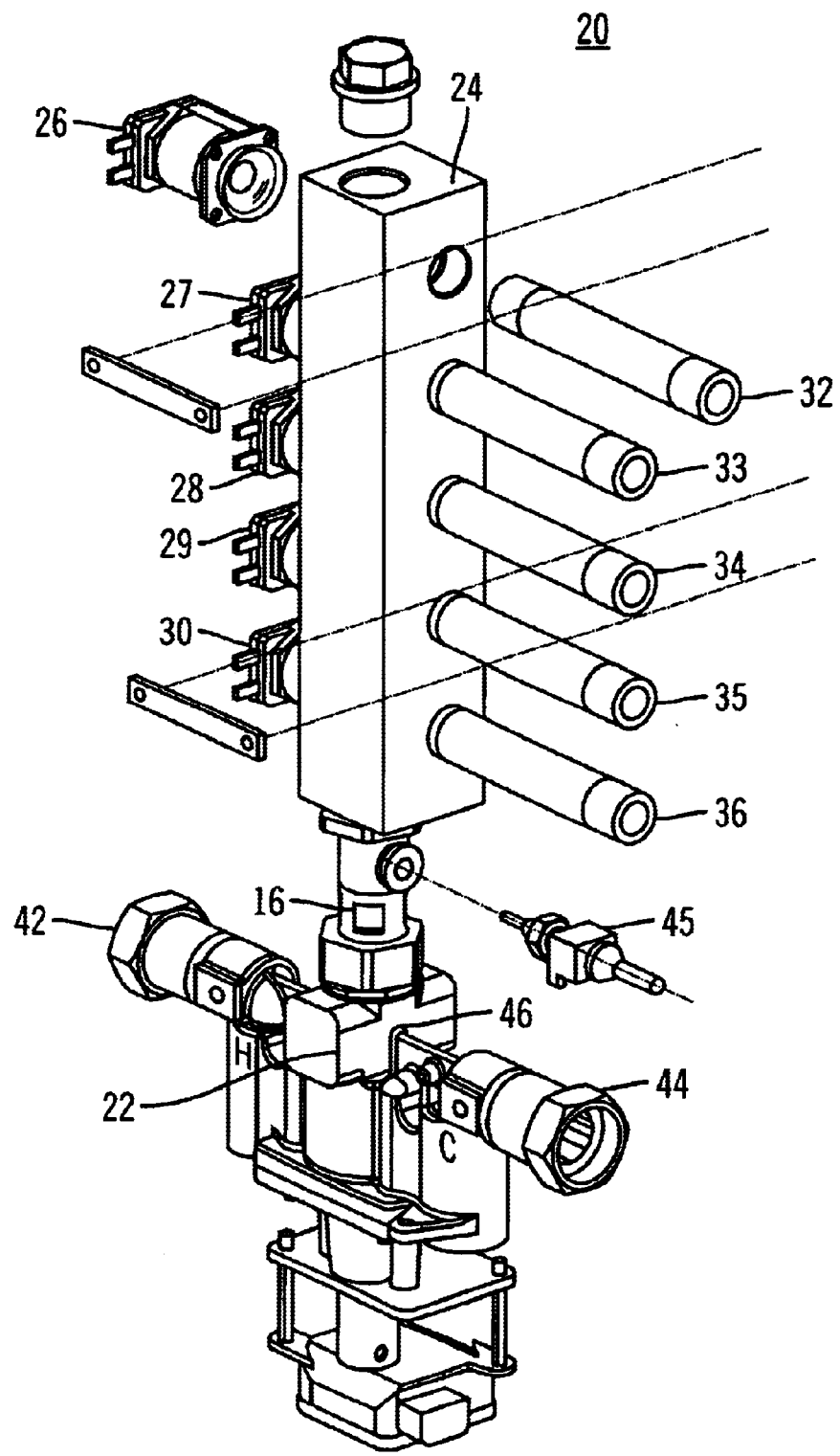
FIG. 2 is a diagram illustrating an exemplary embodiment of the plumbing control unit of the present invention.

FIG. 2 illustrates an exemplary embodiment of the mechanical plumbing control unit 16 described in FIG. 1 which is shown generally at 20. The preferred exemplary embodiment of the mechanical plumbing control unit 16 is comprised of a thermostatic valve 22 and an assembly comprised of a manifold 24 to which is mounted solenoid valves 26, 27, 28, 29 and 30. The manifold 24 has a plurality of openings which exit into transmission lines or extensions 32, 33, 34, 35, 36 leading to individual showerhead installations which have not been shown in this illustration for the sake of convenience. Hot and cold water supply lines 42, 44 feed into the thermostatic control valve 22 which operates under the control of the electronic processing unit 14.

A temperature sensing member 45 is inserted in line from the output 46 of the thermostatic control valve 22 which receives the desired blend of hot and cold water. The electronic processing unit receives a signal representative of the water temperature at the output of the thermostatic control valve 22. This signal is used in order to provide feedback to the electronic processing unit 14 which is able to determine the appropriate adjustment for hot and cold water inlet valves of the thermostatic control valve 22 based on a user selected set temperature. The user selected temperature is fed into the electronic processing unit 14 through the input and control unit 12.

The blended water output from the thermostatic control valve 22 passes by the temperature sensing element 45 and into the manifold 24 which in the preferred exemplary embodiment includes five outputs for transmitting blended water to a corresponding showerhead or other water source which have not been shown in this illustration. Each of the five outputs from the manifold 24 has a corresponding solenoid valve control 26, 27, 28, 29 and 30. which is used to selectively turn on and off water flowing to the corresponding showerhead or other water source. Each of the solenoid valve controls 26, 27, 28, 29 and 30 of the manifold is in electrical communication with the electronic control unit 14. The user is able to select the desired water output from each of the respective shower heads or water sources based on user selection input to the input and display unit 12. Those skilled in the art will appreciate that the various shower heads or water sources utilized in conjunction with the present invention may be positioned in any desired location of the shower facility. In an alternate exemplary embodiment, the solenoid valves described herein are replaced with more capable valves which can be used to selectively adjust the flow rate from each of the shower heads or water sources.

FIG. 3 illustrates an exemplary embodiment of a control unit which is shown generally at 50. The remote control 52 includes a temperature display element 52. Toggle controller 56 is used to selectively increase or decrease the desired set temperature of the system. The remote control unit also preferably includes a timer element 58 for setting and indicating remaining time for system operation. A temp display button 59 is used for selecting display of current set temperatures for the system.

The remote control also provides three pre-set system selection settings 61, 62, 63 for providing a selectable predetermined control of the system. As noted above, in an alternate exemplary embodiment, the control may also be used to provide for the user to selectively control the water pressure at each of the shower heads or water sources in an embodiment where the solenoid valves are replaced with more capable electronic valves.

In accordance with the systems and methods of the present invention, a user is able to selectively modify both temperature and pressure on a plurality of shower heads or other water sources. The system provides the user with tremendous flexibility and is both safe and simple to operate. Those skilled in the art will appreciate that various modifications and changes in a specific design a possible which nevertheless will utilize the concept of the present invention.

Figure 4:
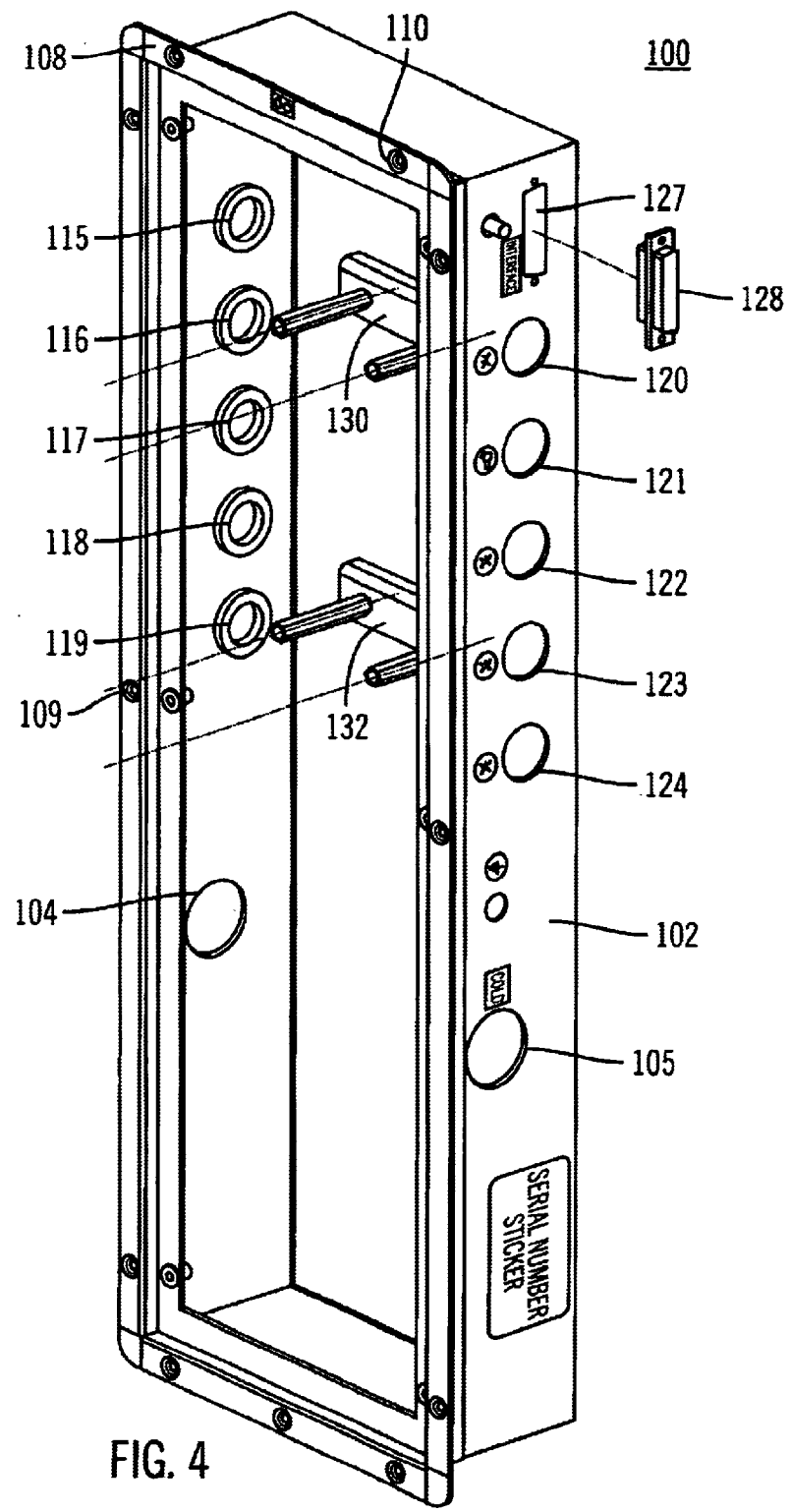
FIG. 4 illustrates a housing for the electromechanical elements which advantageously allows placement of these elements within a typical wall cavity.

FIG. 4 illustrates a preferred exemplary embodiment of a housing for location of the mechanical plumbing control a unit described herein which is shown generally at 100. In the preferred exemplary embodiment, the housing is preferably dimensioned in order to allow placement of the unit within the confines of a typical wall. The housing is preferably comprised of a metallic aluminum rectangular construction 102 which has a depth of less than four inches. This will allow for placement of the unit within a typical wall cavity but will nevertheless allow sufficient room for placement of the necessary electromechanical elements.

In the preferred exemplary embodiment, the housing 102 has openings in opposite side walls 104,105 which provide easy access for hot and cold supply lines which are not shown. In order to provide for convenient installation, the openings 104,105 are positioned in the cavity of the housing 102 such that the respective inlet valves of the thermostatic control valve 22 may be located opposite openings 104, 105 while leaving sufficient room for placement of the manifold within the cavity of the housing 102.

The housing 102 also preferably includes a peripheral flange member 108 which also includes a plurality of openings 109, 110 for receiving screws or other members to secure the housing 102 to adjacent supports such heads, for example, wall studs and like. The preferred exemplary embodiment of the housing 102 also preferably includes openings in the side walls for accommodating water outlets from the manifold 24. As shown in FIG. 4, openings 115, 116, 117, 118, and 119 are located on the left side and openings 120, 121, 122, 123 and 124 are located on the right side. This further enhances the convenience of installing the unit so that the water outlets may be positioned by the installer on either the left or right side of the unit. In the preferred exemplary embodiment, the openings 115–119 and 120–124 are located opposite the corresponding openings in the manifold. Those skilled in the art will appreciate that the solenoid valves do not all have to be located on the same side of the manifold 24 as shown in FIG. 2.

Housing 102, in the preferred exemplary embodiment, also includes openings 127 for receiving D shell connector 128. Alternate connectors may be used as well. The electrical connector provides for electrical communication between the electromechanical elements contained within the housing 102 and the electronic processing and control unit. Housing 102 also preferably includes brackets 130,132 for securing the manifold 24 and related electromechanical elements within the housing 102.

The housing 102 preferably has a depth of less than four inches and more specifically less than three half-inch in order to fit within the confines of a typical wall cavity. Additionally, it is preferred that the housing have a width of less than approximately 14 inches in order to fit between typical stud placement which is 16 inches center to center. In a preferred embodiment, the housing provides three inches of space on either side of the unit when the unit is placed between two conventional studs. This advantageously allows easy access to the side openings for placement of plumbing fittings.

I claim:

1. A system for controlling temperature and pressure at a plurality of water sources comprising:
   a housing adapted to be located within a wall;
   an input and display unit;
   an electronic processing unit in electrical communication with the input and display unit; and
   a plumbing control unit located inside the housing, comprising:
   a thermostatic control valve having inputs in fluid communication with hot and cold sources of water and an output for outputting a mixture of hot water and cold water; and
   a manifold having an input in fluid communication with the output of the thermostatic control valve, and a plurality of outputs positioned on one side wall of the manifold and in fluid communication with a corresponding plurality of water source supply lines, each of said plurality of outputs of said manifold having a corresponding electronic fluid control valve positioned on another side wall of the manifold and located within the housing.

2. The system for controlling temperature and pressure as claimed in claim 1, wherein the housing has a depth of less than four inches.

3. The system for controlling temperature as claimed in claim 1, wherein the plurality of water sources comprises a plurality of shower heads.

4. The system for controlling temperature and pressure as claimed in claim 1, wherein the housing is rectangular, having opposing top and bottom walls and opposing side walls.

5. The system for controlling temperature and pressure as claimed in claim 4, wherein the opposing side walls contain opposing apertures that are aligned with hot and cold water supply lines on the thermostatic control valve.

6. The system for controlling temperature and pressure as claimed in claim 4, wherein the housing contains a peripheral flange member having a plurality of openings for securing the housing to wall studs.

7. The system for controlling temperature and pressure as claimed in claim 6, wherein the housing is less than 14 inches wide.

8. The system for controlling temperature and pressure as claimed in claim 4, wherein the opposing side walls contain a plurality of opposing apertures that are aligned with hot and cold water supply lines on the thermostatic control valve and are aligned with the plurality of outputs on the manifold.

9. The system for controlling temperature and pressure as claimed in claim 4, wherein one of said opposing side walls contains a D shell connector for electrical communication between the electronic processing unit and the plumbing control unit.

10. The system for controlling temperature and pressure as claimed in claim 1, wherein the plumbing control unit is disposed entirely within the wall and is not visible to a user of the system for controlling temperature and pressure.

11. The system for controlling temperature and pressure as claimed in claim 1, further comprising a temperature sensing element adapted to be located within the housing and located between the input of the manifold and the output of the thermostatic control valve.

12. A plumbing control system, comprising:
   a thermostatic control valve having inputs in fluid communication with hot and cold sources of water and an output for outputting a mixture of hot water and cold water;
   a plurality of water source supply lines;
   a manifold having an input in fluid communication with the output of the thermostatic control valve, and a plurality of outputs positioned on one side wall of the manifold and in fluid communication with a corresponding plurality of water source supply lines, each of the outputs for the manifold having a corresponding electronic fluid control valve positioned on another side wall of the manifold; and
   an enclosure housing the thermostatic control valve and the manifold, the enclosure adapted to be within a wall.

13. The plumbing control system as claimed in claim 12, further comprising a temperature sensing element located between the input of the manifold and the output of the thermostatic control valve.

14. The plumbing control system as claimed in claim 12, further comprising an electronic processing unit for controlling the thermostatic control valve to mix the hot water and the cold water such that the mixture of the hot water and the cold water that is output from the thermostatic control valve has a predetermined temperature.

15. The plumbing control system as claimed in claim 14, further comprising an input and display unit for transmitting control signals to the electronic processing unit.

16. The plumbing control system as claimed in claim 12, further comprising an electronic processing unit for adjusting the flow of water from each of the outputs of the manifold by controlling the fluid control valve for each of the outputs of the manifold.

17. The plumbing control system as claimed in claim 16, further comprising an input and display unit for transmitting control signals to the electronic processing unit.

* * * * *